US006866512B2

(12) United States Patent
Ebersole, Jr. et al.

(10) Patent No.: US 6,866,512 B2
(45) Date of Patent: Mar. 15, 2005

(54) RUGGEDIZED INSTRUMENTED FIREFIGHTER'S VARI-NOZZLE

(75) Inventors: John Franklin Ebersole, Jr., Bedford, NH (US); Mark Stanley Bastian, Manchester, NH (US)

(73) Assignee: Information Decision Technologies, LLC, Bedford, NH (US)

( * ) Notice: Subject to any disclaimer, the term of this patent is extended or adjusted under 35 U.S.C. 154(b) by 108 days.

(21) Appl. No.: 10/213,677

(22) Filed: Aug. 6, 2002

(65) Prior Publication Data

US 2003/0006045 A1 Jan. 9, 2003

Related U.S. Application Data

(63) Continuation-in-part of application No. 09/826,993, filed on Apr. 5, 2001, now Pat. No. 6,607,038, and a continuation-in-part of application No. 09/525,983, filed on Mar. 15, 2000, now Pat. No. 6,500,008.

(51) Int. Cl.[7] .......................... G09B 19/00; A62C 11/00
(52) U.S. Cl. .......................................... 434/226; 169/30
(58) Field of Search ................................ 434/226, 219; 169/30, 14, 15, 51, 52; 239/67–74, 581.1, 581.2, 288, 288.3; 116/264, 277; 137/554, 556.6

(56) References Cited

U.S. PATENT DOCUMENTS

| | | | | | |
|---|---|---|---|---|---|
| 2,806,741 | A | * | 9/1957 | Fishelson et al. | 239/456 |
| 3,540,657 | A | * | 11/1970 | Thompson | 239/458 |
| 5,460,228 | A | * | 10/1995 | Butler | 169/30 |
| 5,518,402 | A | * | 5/1996 | Tommarello et al. | 434/226 |
| 5,823,784 | A | * | 10/1998 | Lane | 434/226 |
| 5,918,807 | A | * | 7/1999 | Doss | 239/1 |
| 6,129,552 | A | * | 10/2000 | Deshoux et al. | 434/226 |

* cited by examiner

*Primary Examiner*—Steven J. Ganey
*Assistant Examiner*—Darren Gorman
(74) *Attorney, Agent, or Firm*—Brian M. Dingman, Esq.; Mirick, O'Connell, DeMallie & Lougee, LLP

(57) ABSTRACT

The purpose of the invention is to protect an instrumented firefighter's fire hose nozzle from shock and undesirable environmental pollutant penetration. The invention provides for doing this through the use of a rugged cover on the equipment as well as soft equipment mounts. The cover provides the instrumentation with protection from impact as well as protection from contamination by environmental pollutants. On the inside of the cover, the shock sensitive equipment is seated on an island that is mounted by one or more soft vertical posts, which protect this equipment from shock.

18 Claims, 4 Drawing Sheets

RUGGEDIZED INSTRUMENTED FIREFIGHTER'S VARI-NOZZLE

CROSS REFERENCE TO RELATED APPLICATIONS

This application is a Continuation in Part of "Augmented Reality Based Firefighter Training System" PTO Ser. No. 09/525,983 filed Mar. 15, 2000 now U.S. Pat. No. 6,500,008, and of "Instrumented Firefighter's Nozzle and Method" PTO Ser. No. 09/826,993 filed Apr. 5, 2001 now U.S. Pat. No. 6,607,038.

GOVERNMENT RIGHTS

This invention was made with Government support under Contract Number N61339-01-C1008 awarded by the Department of the Navy. The Government has certain rights in the invention.

FIELD OF THE INVENTION

This invention relates to protection of equipment for real-time data acquisition for purposes of measuring the operation of a fire hose nozzle.

COPYRIGHT INFORMATION

A portion of the disclosure of this patent document contains material that is subject to copyright protection. The copyright owner has no objection to the facsimile reproduction by anyone of the patent document or the patent disclosure as it appears in the Patent and Trademark Office records but otherwise reserves all copyright works whatsoever.

BACKGROUND OF THE INVENTION

Information establishing the real-time position and orientation of a nozzle (e.g., a firefighter's nozzle) is useful in AR and VR, as is information establishing the settings of the nozzle bail handle and pattern selector. This information can be gathered by instrumenting a firefighter's fire hose nozzle. This instrumentation will not work effectively, however, if it is subjected to severe shock or other undesirable environmental hazards, such as penetration by water. The undesirable presence of shock or pollutants can result in negative effects ranging from poor calibration of equipment all the way to equipment failure or equipment destruction. Therefore, it is very desirable to protect the nozzle instrumentation being used for AR and VR.

SUMMARY OF THE INVENTION

Mechanical and electronic components have been incorporated into the fire hose nozzle and must be protected from shock and penetration by undesirable materials. The field in which the invention is currently used is that of virtual reality (VR) and augmented reality (AR). The invention is used to protect equipment which is used as an input device to control a computer-generated water stream and align the graphical appearance of that stream with the actual nozzle in a manner consistent with its operation. A purpose of the invention is to protect an instrumented firefighter's fire hose nozzle from shock and undesirable environmental pollutant penetration. The invention provides a means for doing this through the use of a rugged cover on the equipment as well as soft equipment mounts. The cover provides the instrumentation with protection from impact as well as protection from contamination by environmental pollutants. On the inside of the cover, the shock sensitive equipment is seated on an island that is mounted by a soft vertical post. This protects this equipment from shock.

DETAILED DESCRIPTION OF THE PREFERRED EMBODIMENT OF THE INVENTION

Equipment to be Protected

In the preferred embodiment of the invention, the nozzle to be used is an Elkhart vari-nozzle. The instrumentation for the nozzle consists of (1) a potentiometer used to measure the nozzle fog pattern; (2) a potentiometer used to measure the nozzle bail angle; (3) an INTERSENSE (Burlington, Mass.) InertiaCube used to measure the nozzle orientation; and (4) two INTERSENSE (Burlington, Mass.) SoniDiscs used to measure the nozzle position. All of this equipment is connected by wiring that carries message signals through a tether to a computer and associated equipment, which receives and processes these signals. The InertiaCube and SoniDiscs are equipment from the InterSense IS-600 line of tracking equipment. If the end use of the nozzle calls for the use of tracking equipment other than the IS-600 line, the invention could readily be adapted to protect equipment from the IS-900 line from InterSense, and 3rd Tech's optical tracking equipment. The shell and island described below would need to be modified slightly to hold the different tracking equipment in place.

Equipment Mounting and Connections

Figure 1:
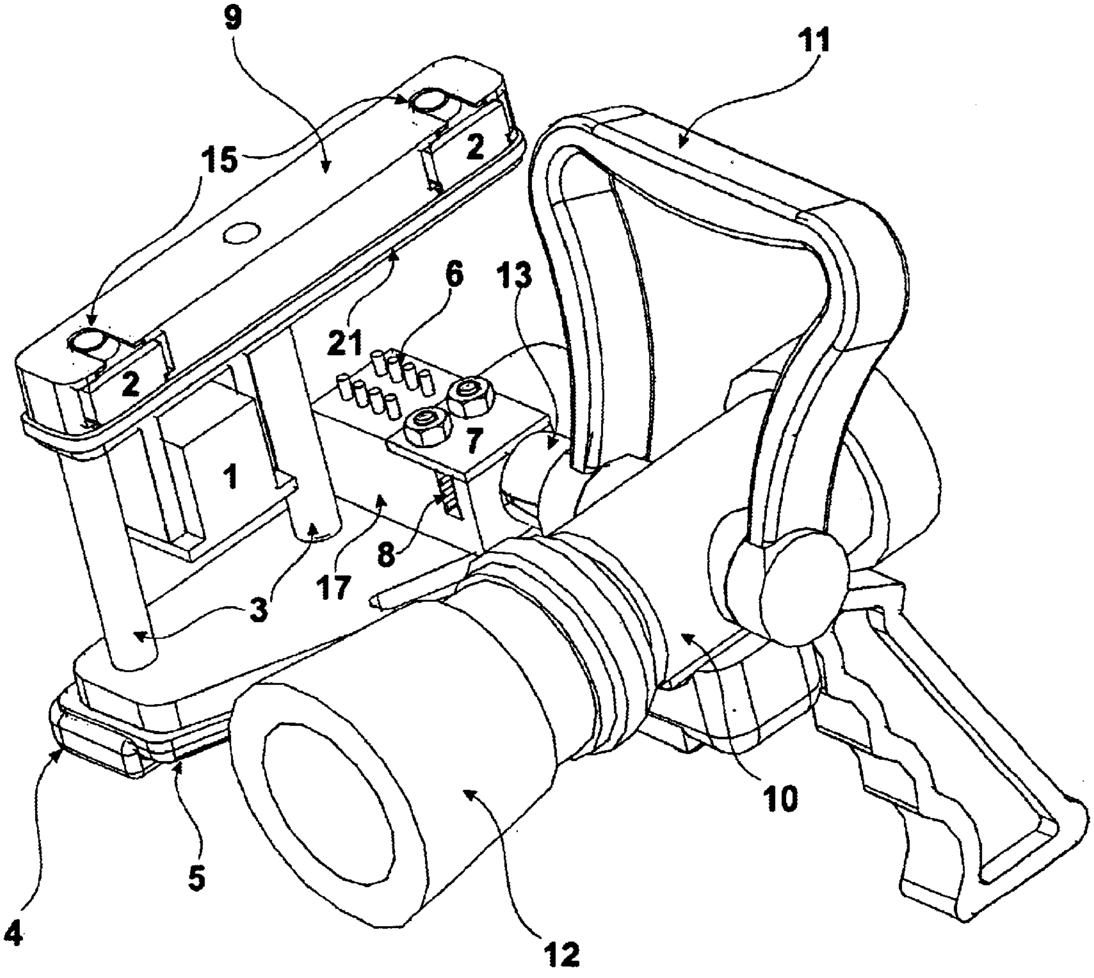
FIG. 1 is a perspective view of a nozzle and all of the major instrumentation components involved in the preferred embodiment of the invention, except for the cover.
Figure 2:
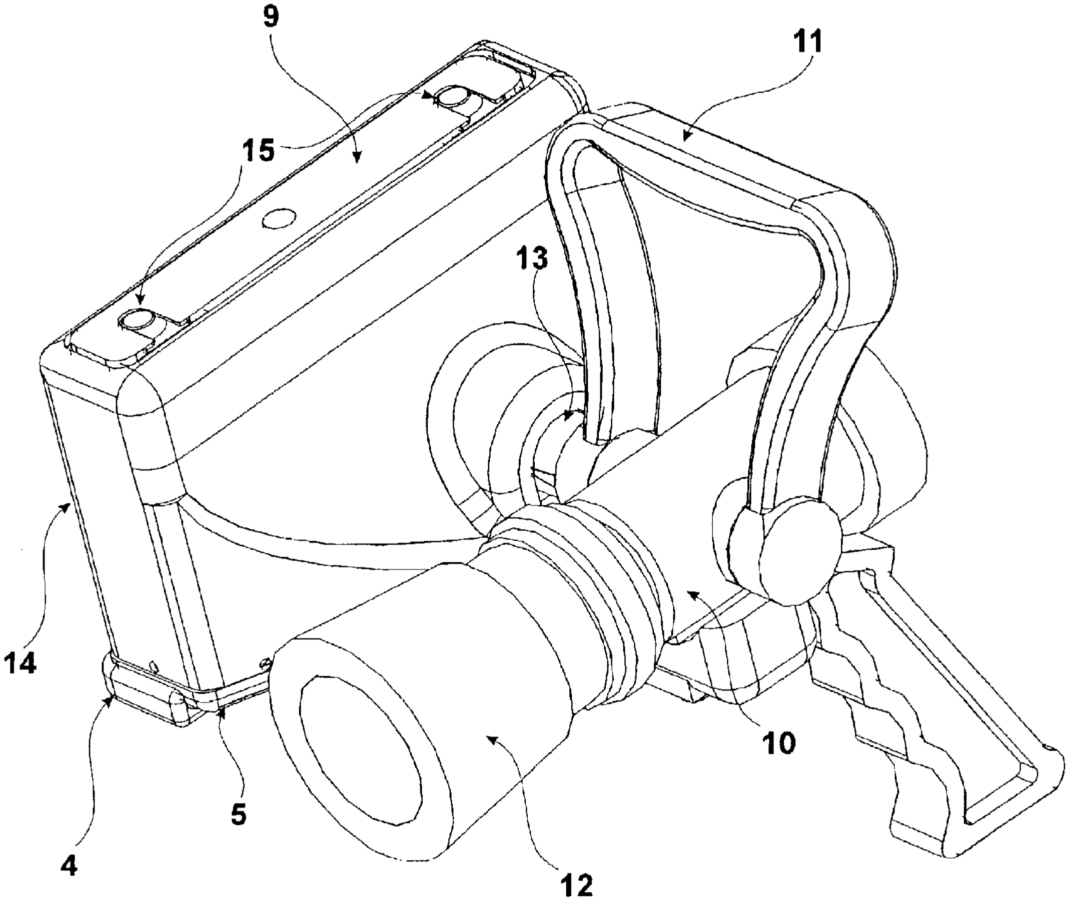
FIG. 2 is the same as FIG. 1, but with the cover in place.
Figure 3:
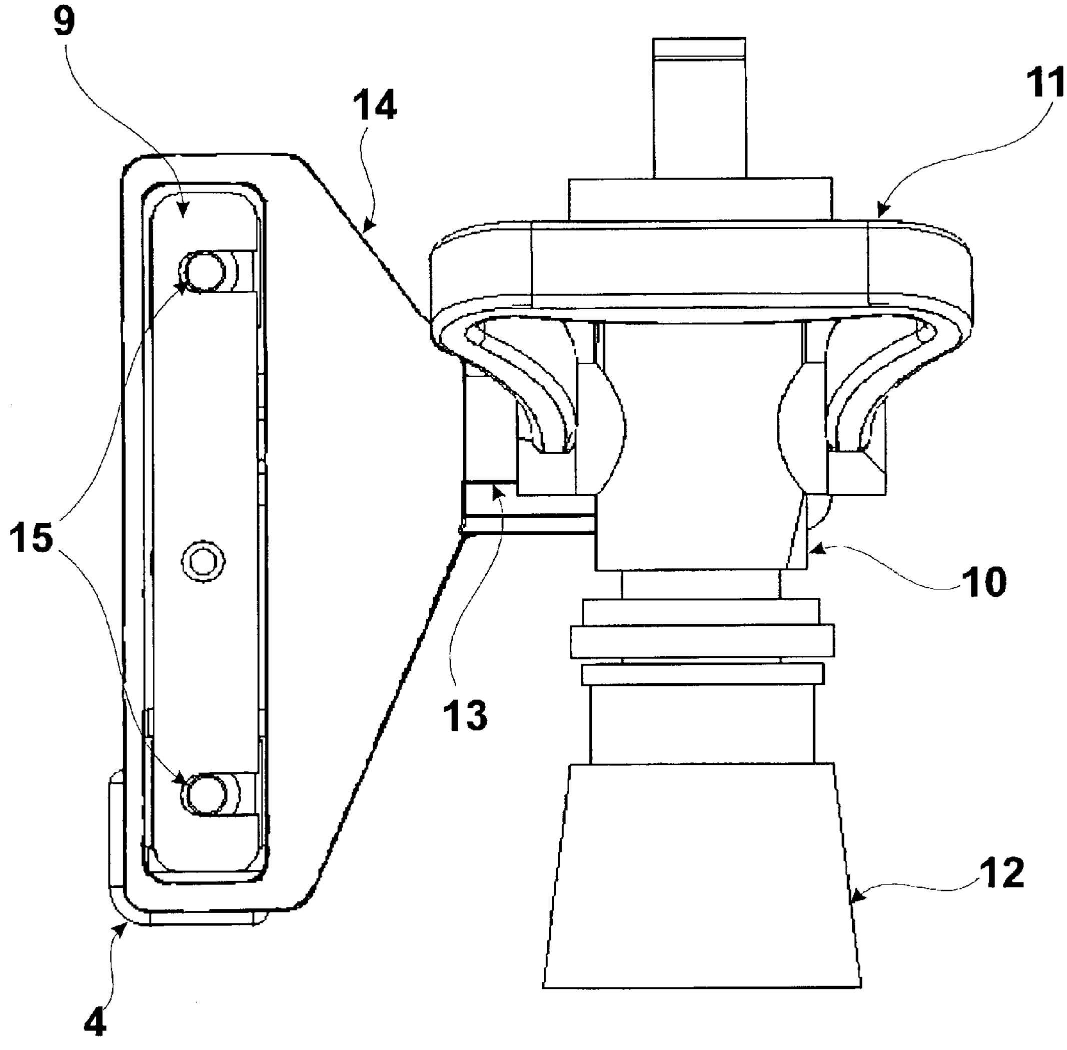
FIG. 3 is a top view of the fully assembled ruggedized nozzle of FIG. 2.
Figure 4:
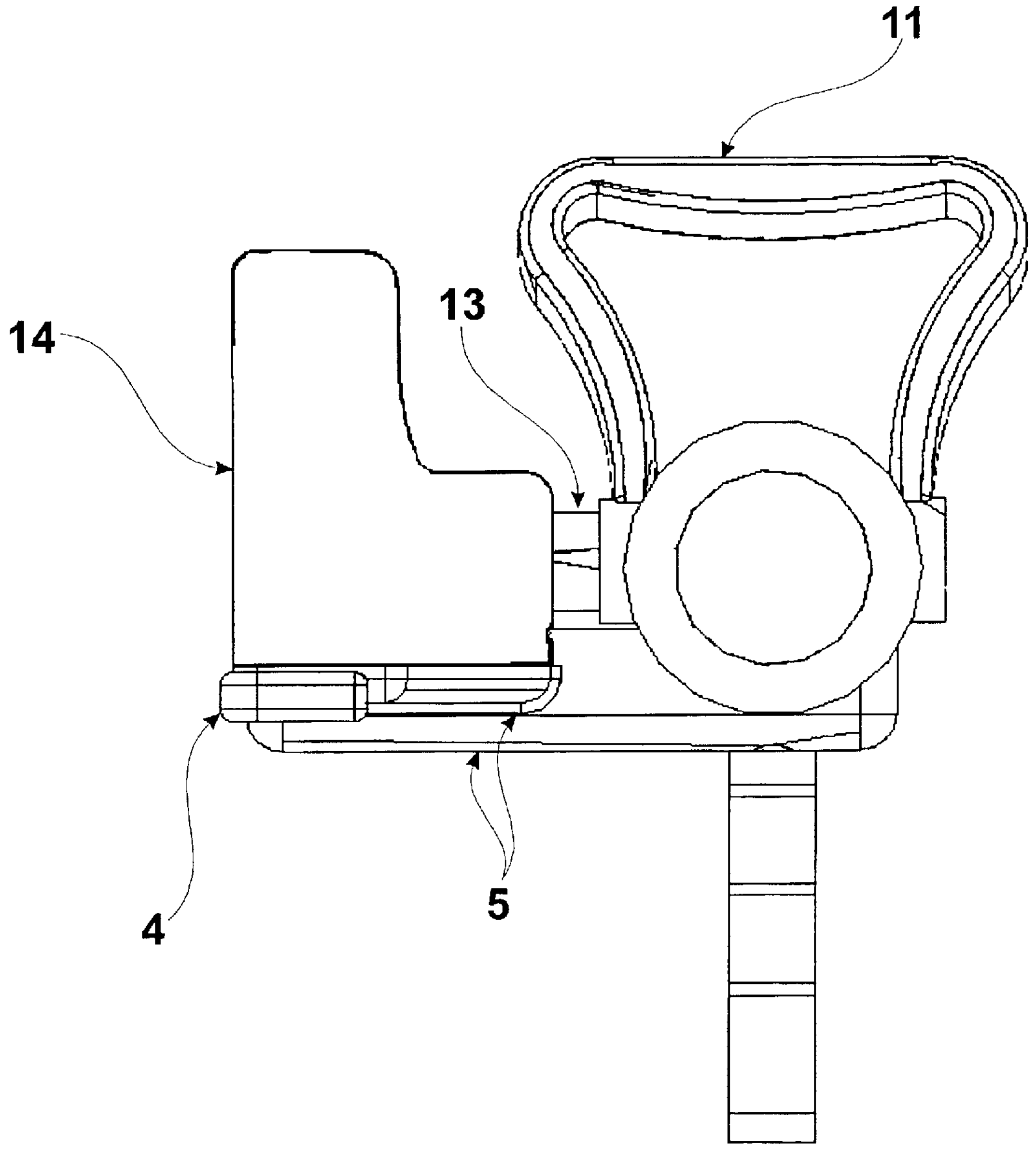
FIG. 4 is a front view of the fully assembled ruggedized nozzle of FIG. 2.

In FIG. 1, at least two potentiometers (not visible, but with one under potentiometer cover 7 to measure the position of bail 11 and one within the pattern selector 12 to measure its position) are mounted directly to the vari-nozzle 10. The InertiaCube 1 and SoniDiscs 2 are attached to a rigid, yet floating hard plastic island 9 which holds these items firmly in place. This island 9 is attached to a rigid hard plastic base 5 by two narrow, flexible posts 3. The base 5 is rigidly attached to the nozzle. A hard plastic cover 14 (FIG. 2) attaches to the base 5, providing a means for hiding all electronic equipment from view, except for the speakers or microphones or optical receivers 15 (FIG. 2) on top of the position trackers, e.g. SoniDiscs 2, which must be exposed. This cover 14 (FIG. 2) also constrains the floating island 9 from freely drifting laterally on the very flexible posts 3. The potentiometer underneath plate 7, which measures the angle of the bail 11, is attached to the nozzle 10 by a soft polymeric coupling 13. The signal wires coming from certain instrumentation are attached to mounting block 17 using screw-down connectors or soldering posts 6 integrated inside of the cover. The purpose of using this sort of connection is that the wires can be held much more securely with this method rather than standard plugs. By using solder or strong screw-down terminals, the wire connections can be assured a quality connection. A separate cable (not shown) connects this common mounting block 17 to the computer and associated equipment which receives data from the nozzle. The specific wires that can be easily mounted in this way include (a) the leads from the SoniDiscs 2, and (b) the wires attached to the leads 8 of the potentiometer under plate 7 and the potentiometer inside the pattern selector 12. The cable connection to the InertiaCube 1 may not be suitable to separately wire in this fashion since the InertiaCube signals may be sensitive to interference due to shielding concerns, though it should be possible to use a connector provided from InterSense. The wires and/or cables are routed through a hole in the nozzle (not shown), and down the hose (not shown) to the end where they can come out and connect to the needed equipment. This method keeps the wires from being visible to the user.

Equipment Shock and Contamination Protection

The equipment is protected by a plastic cover 14, which protects the overall assembly from both shock and penetration by foreign agents, such as water and dirt. The INTERSENSE (Burlington, Mass.) InertiaCube is sensitive to shock, especially the action of the metal bail handle 11 hitting the metal stops at either extreme of its range of motion. The InertiaCube and SoniDiscs are mounted on an island which is held up by two soft polymeric pillars. This provides a great deal of protection against shock from slamming the bail handle all the way forward very quickly. This island is also surrounded by a thin layer of padding 21 (shown in part in FIG. 1 located between the island 9 and the cover 14 to protect the island from horizontal shock. This thin layer also provides further protection from penetration by foreign agents, and can be made such that an actual seal is made around the circumference of the island. A small shoe made of soft material is used as a bumper 4 to prevent shock caused by setting the device down too rapidly or dropping it. The shoe also provides wear resistance to the base part in the assembly. The shoe is also a visual cue to the user that the device is to be set down using the shoe as a contact point.

Protection Against Misuse

To prevent the user from accidentally using the device to spray water as in a real fire emergency, the protective design uses an alternating yellow and black color scheme (not shown) to get the user's attention that this is not a standard part. Additionally, a sign attached to the cover (not shown) is used which indicates that the device is to be used for training purposes only.

Alternate Embodiments of the Invention

The described invention may be implemented with other variations. For example, the island of electronics need not be supported by two soft posts. One larger post or many smaller posts could also be used. The wires connecting the common mounting block to the computer need not be continuous. Instead, a wireless system may be used in which the common mounting block connects to the transmitter, which may be located inside the instrumentation cover, which transmits signals to the computer receiver. The color scheme of the invention need not be alternating black and yellow. The connectors on the common mounting block need not be screw-down or soldering posts for soldering the wires to, they can also be quick release connectors.

What is claimed is:

1. A ruggedized instrumented firefighter's vari-nozzle comprising:

a firefighter's vari-nozzle with a bail;

instrumentation, coupled to the vari-nozzle, to measure the nozzle bail angle;

additional instrumentation, coupled to the vari-nozzle, to measure the nozzle position and orientation; and a covering device which protects said instrumentation and said additional instrumentation.

2. The ruggedized instrumented firefighter's vari-nozzle of claim 1 in which said nozzle has a pattern selector and is further instrumented for measuring said nozzle pattern selector position.

3. The ruggedized instrumented firefighter's vari-nozzle of claim 1 in which said instrumentation and said additional instrumentation is electronically connected at one location by a single connector.

4. The ruggedized instrumented firefighter's vari-nozzle of claim 3 in which said single connector has soldering posts for connections.

5. The ruggedized instrumented firefighter's vari-nozzle of claim 3 in which said single connector has screw down connections.

6. The ruggedized instrumented firefighter's vari-nozzle of claim 1 in which all instrumentation connecting wires exit the instrumented vari-nozzle through the nozzle-hose interface.

7. The ruggedized instrumented firefighter's vari-nozzle of claim 1 in which said instrumentation to measure the nozzle position and orientation comprises a microphone.

8. The ruggedized instrumented firefighter's vari-nozzle of claim 1 in which said instrumentation to measure the nozzle position and orientation comprises a speaker.

9. The ruggedized instrumented firefighter's vari-nozzle of claim 1 in which said instrumentation to measure the nozzle position and orientation comprises an optical receiver.

10. The ruggedized instrumented firefighter's vari-nozzle of claim 1, further comprising a structure coupled to the vari-nozzle for supporting at least the instrumentation to measure the nozzle position and orientation.

11. The ruggedized instrumented firefighter's vari-nozzle of claim 10, further comprising a floating island coupled to said structure by soft supports, said floating island supporting said instrumentation to measure nozzle position and orientation.

12. The ruggedized instrumented firefighter's vari-nozzle of claim 11 in which said island is supported by at least one soft post.

13. The ruggedized instrumented firefighter's vari-nozzle of claim 11 in which said island is protected from lateral shock and motion by a soft barrier.

14. The ruggedized instrumented firefighter's vari-nozzle of claim 10 in which a soft bumper is placed on said structure to protect said structure from shock.

15. The ruggedized instrumented firefighter's vari-nozzle of claim 10, wherein said covering device covers said structure, to protect at least the instrumentation to measure the nozzle position and orientation from shock and environmental hazards.

16. The ruggedized instrumented firefighter's vari-nozzle of claim 15 in which said covering device is sealed against at least the island to also provides protection against water, dirt, and contaminant penetration.

17. The ruggedized instrumented firefighter's vari-nozzle of claim 15 in which all wires and instrumentation, except those which must be exposed in order to function properly, are hidden from view by said covering device.

18. A ruggedized instrumented firefighter's vari-nozzle comprising:

a firefighter's vari-nozzle with a bail;

instrumentation, coupled to the vari-nozzle, to measure the nozzle bail angle;

additional instrumentation, coupled to the vari-nozzle, to measure the nozzle position and orientation;

a structure coupled to the vari-nozzle for supporting at least the instrumentation to measure the nozzle position and orientation;

a floating island coupled to said structure by soft supports, said floating island supporting said instrumentation to measure nozzle position and orientation; and a covering device for covering said structure and said floating island, to protect the instrumentation from shock and environmental hazards.

* * * * *